Sept. 12, 1944.  W. H. NOBLES  2,358,131

COUPON FEEDER

Filed Aug. 1, 1942  5 Sheets-Sheet 3

INVENTOR:
WARREN H. NOBLES
BY *Arthur R. Wylie*
ATTY.

Sept. 12, 1944.  W. H. NOBLES  2,358,131
COUPON FEEDER
Filed Aug. 1, 1942  5 Sheets-Sheet 4
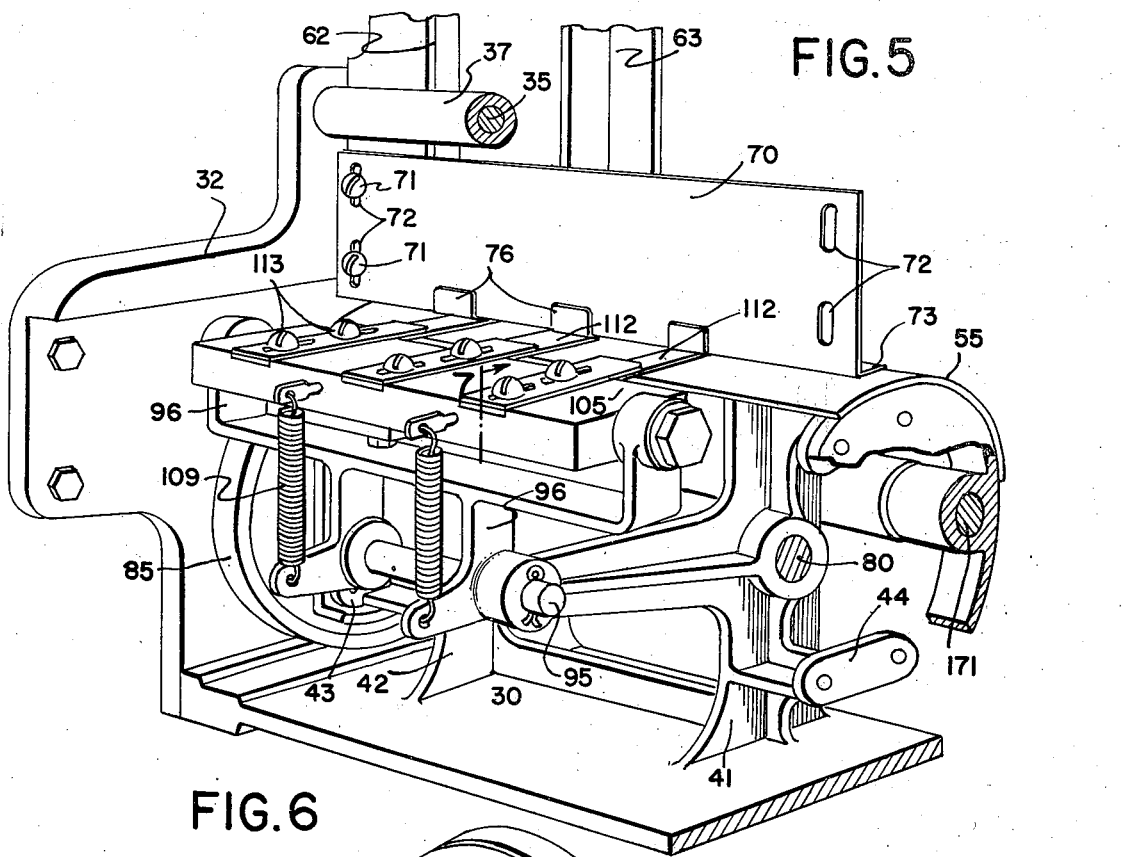
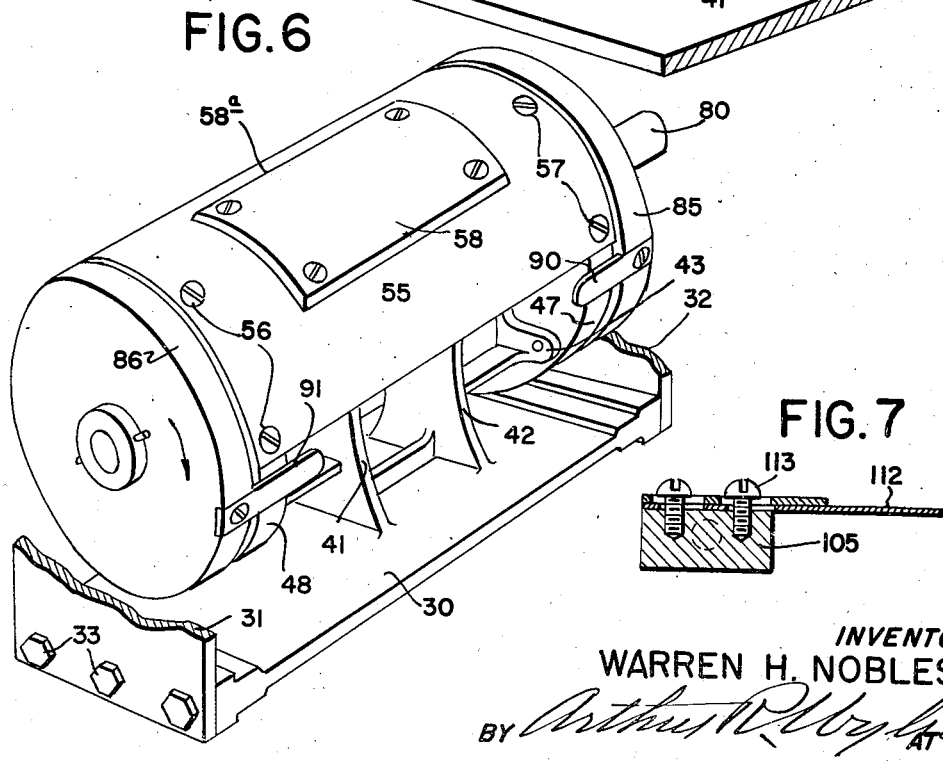
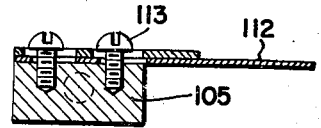
INVENTOR:
WARREN H. NOBLES

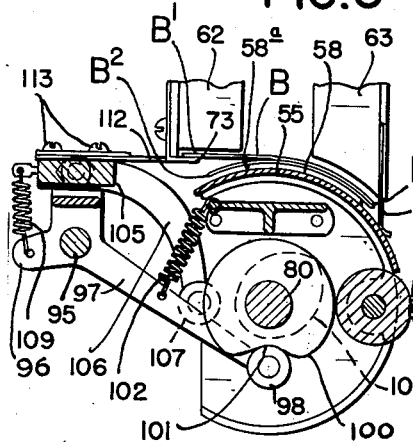
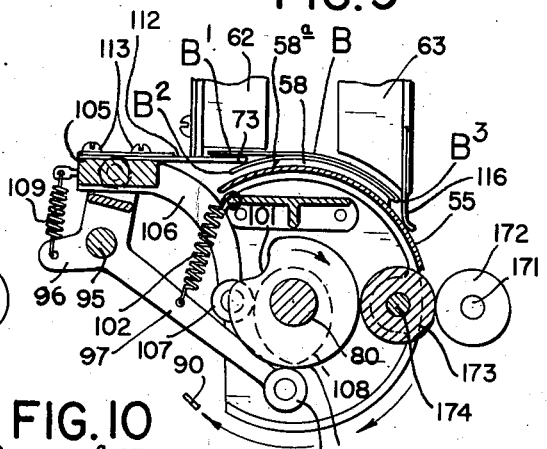
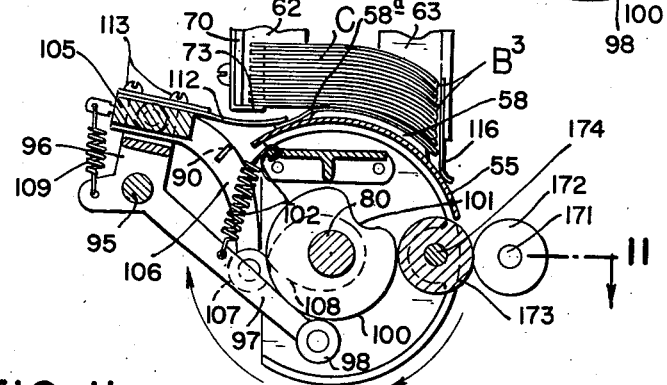
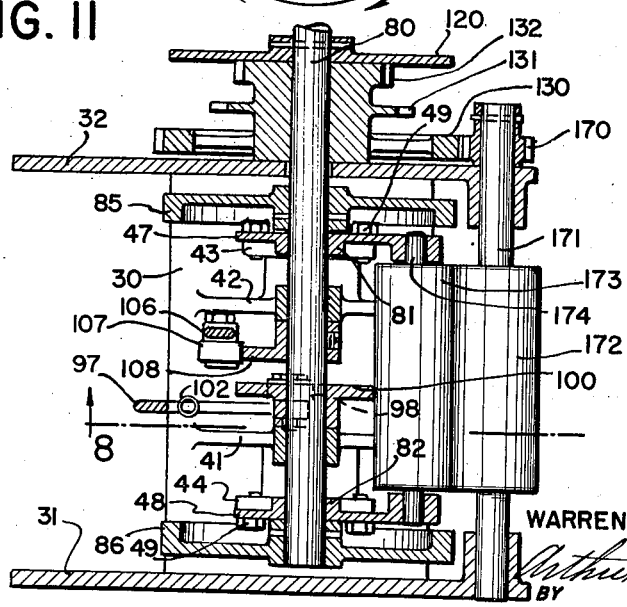

Patented Sept. 12, 1944

2,358,131

UNITED STATES PATENT OFFICE 2,358,131

COUPON FEEDER

Warren H. Nobles, St. Paul, Minn., assignor to General Mills, Inc., a corporation of Delaware Application August 1, 1942, Serial No. 453,147

10 Claims. (Cl. 271—41)

This invention relates to devices for feeding coupons and other paper folders to bags, cartons and similar containers.

An object of the invention is to provide a simple and efficient form of coupon feeders.

This and other objects as will hereinafter appear are accomplished by this invention which is fully described in the following specification and shown in the accompanying drawings in which Figure 1 is a partial perspective of the machine showing the coupon feeder used with a belt conveyor;

Fig. 5 is a partial perspective showing an end removed to illustrate the coupon gripping mechanism;

Fig. 6 is a perspective showing the arcuate coupon supporting surface and the picker fingers;

Fig. 7 is a partial section on the line 7 of Fig. 5;

Figs. 8, 9 and 10 are partial vertical sections on the line 8 of Fig. 11; and

Fig. 11 is a horizontal section on the line 11 of Fig. 10.

Figure 1:
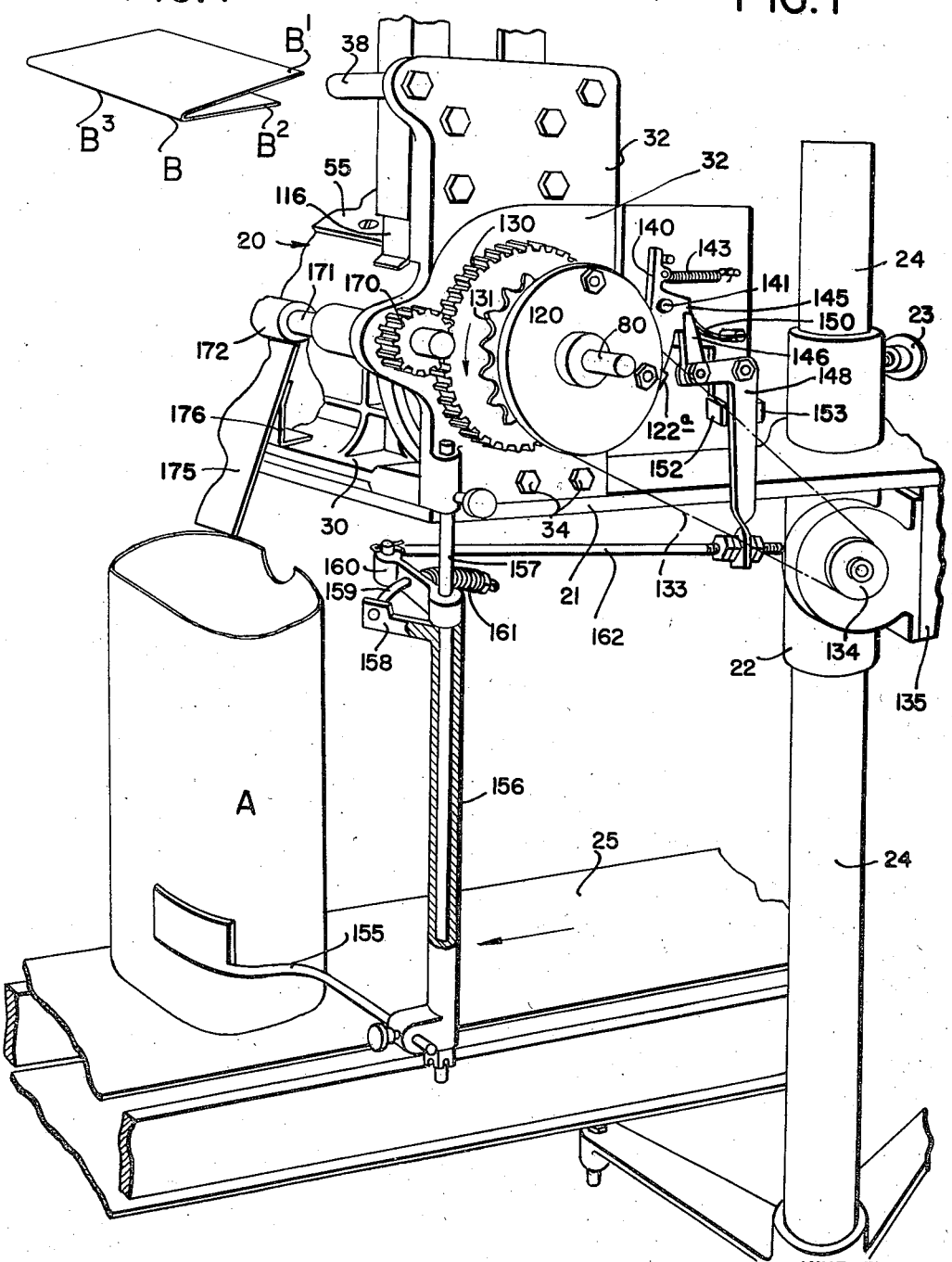
Fig. 1a is a perspective of a folded coupon.

The embodiment illustrated comprises a coupon feeder shown generally as 20 mounted on a bracket 21 having a sleeve 22 and screw 23 by means of which it is adjustably secured on a standard 24 which is supported in any desired manner near the side of a belt conveyor 25 or the like for intermittently conveying filled bags A into each of which it is desired to feed a coupon.

A form of coupon B to be fed is shown in Fig. 1a and Figs. 9, 10 and 11 and will later be described in detail.

The feeding mechanism is carried mainly by a main frame casting 30 secured by screws (not shown) to the bracket 21. End frame members 31, 32 are secured to the bottom ends of the main frame by means of screws 33, 34 and are secured together at the top by means of through bolts 35, 36 on which are placed spacer tubes 37, 38.

The main frame casting 30 has central ribs 41, 42 which have oppositely extending integral lugs 43, 44 (Figs. 5 and 11) to which are secured end plates 47, 48, respectively, by means of capscrews 49.

A transversely arcuate plate 55, preferably bent about the axis of a shaft 80, is secured to the top of the end plates 47, 48 by means of screws 56, 57 (Fig. 6). This carries a central raised plate 58 which serves to support the stack of coupons as shown in Figs. 8 to 10, as will later be described in detail.

Figure 2:
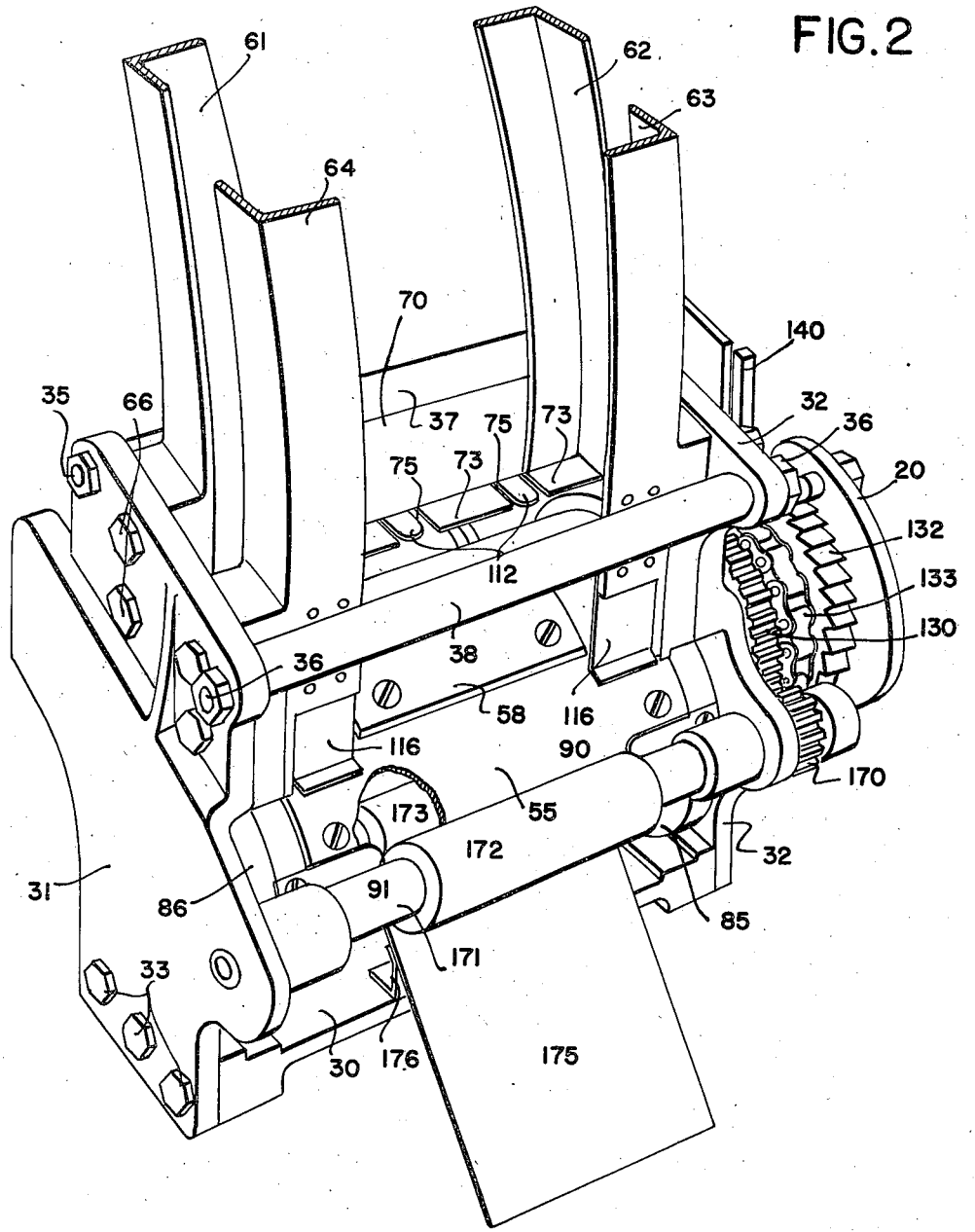
Fig. 2 is a perspective of the front or delivery side of the feeder.

Referring particularly to Fig. 2, four arcuate guide angles 61, 62, 63 and 64 set at the four corners of a rectangle serve to guide the stack of coupons C as shown in Fig. 10. These angles are secured to the end frame members 31 and 32 by means of capscrews 66 and 67. To the back of the angles 61 and 62 is secured a supporting plate 70 by means of small capscrews 71 (Fig. 5) in vertical slots 72 which permit of vertical adjustment of this plate. The bottom of this plate is bent inwardly at 73, as shown in Figs. 2 and 10, to serve as a supporting ledge for the rear edge of the stack of coupons C. This ledge is cut away at three spaced points 75 to form ears 76 which are bent down and around so as to be parallel with the plate 70 as shown in Fig. 5. The purpose of these cut away portions is to provide spaces for spring grippers which will later be described.

A main shaft 80 is journalled in suitable bearings 81 and 82 in the end plates 47 and 48 and has disks 85, 86 pinned thereto. These disks as shown in Fig. 6 carry aligned inwardly extending picker fingers 90, 91 which are inset therein and secured by screws. These picker fingers pass over the top of the arcuate plate 55 but are spaced somewhat therefrom so that as they rotate in a clockwise direction as shown in Fig. 6 they will pick up the lowermost coupon from the stack and carry it forward as will later be described.

Extensions of the ribs 41 and 42 carry a pin 95 on which is pivotally mounted a rocking frame 96. As shown in Figs. 8 to 10 it carries an operating lever 97 on the lower end of which is pivotally mounted a roller 98 which rolls on a cam 100 which is keyed on the main shaft 80. This cam is principally concentric with the shaft 80 and has a depression 101 which permits the frame 96 to rock into the position shown in Fig. 8. A spring 102 holds the roller 98 in contact with the cam 100.

A block 105 is pivotally mounted in the upper portion of the rocking frame 96 and has an arm 106 on the outer end of which is pivotally mounted a roller 107 which rolls upon a cam 108 which is secured to the main shaft 80. A spring 109 urges the roller constantly into engagement with this cam.

The block 105 has three spring grippers 112 secured thereto by means of screws 113. These spring grippers, when in the position shown in Fig. 8, are located in the spaces 75 as shown in Fig. 2.

It will be observed in Figs. 1a and 8 a coupon B is folded so as to form an upper overhanging edge $B^1$ and a lower overlapped edge $B^2$ and that the coupons are placed in the stack with the edges so placed with the fold B³ at the forward edge.

At the same time the rear edge 58ª of the raised central plate 58 lies some distance in advance of the forward edge of the ledge 73 and the spring grippers 112. Both the latter extend in far enough to engage the overlapping edge B¹ of the coupon but not far enough to engage the overlapped edge B². As a result, the unsupported edge B² of the coupon which overhangs the rear edge 58ª of the plate 58 drops as shown in Fig. 8. As the cam 100 rotates in a clockwise direction from Fig. 8, it advances the spring grippers from the position shown in Fig. 8 to that of Fig. 9 where it now overlaps the rear edge B² of the coupon. As the shaft continues to advance as shown in Fig. 10, the roller 107 rolling on the cam 108 causes the block 105 to rock about its own axis in a clockwise direction so that the spring grippers 112 grip the rear edge of the coupon, pressing it against the top of the arcuate plate 55.

These spring grippers continue to so hold the rear edge of the coupon down so as to insure the picker fingers 90 and 91 passing over the overlapped edge B² and under the overlapping edge B¹.

The means at the forward edge of the coupon permitting the lowermost coupon to be removed while holding the coupons above it will now be considered. This consists of spring plates 116 secured to the lower ends of the guide angles 63 and 64 as shown in Fig. 2. This permits all but the lowermost one of the coupons to be retained by these spring plates while the lowermost coupon is bent down over the ends of the central raised plate 58 and permitted to pass under the spring plates 116. As they advance they are stripped from the picker fingers as will later be described.

Figure 4:
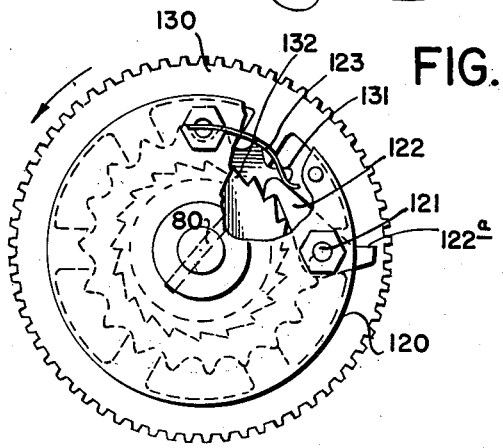
Fig. 4 is a partial section showing the drive gear and ratchet mechanism.

The means for driving the shaft 80 will now be described. A disk 120 (Figs. 4 and 11) is keyed or pinned to the shaft 80 and has a pin 121 on which is pivotally mounted a pawl 122 which is normally pressed inwardly by means of a spring 123. A member consisting of a gear 130, a sprocket 131 and a ratchet 132 is mounted to rotate freely on the shaft 80 with the ratchet 132 adjacent the disk 120 so that it becomes engaged by the pawl 122.

The sprocket 131 is driven by means of a chain 133 (Fig. 1) from the sprocket 134 which is driven by a suitable electric motor 135, preferably carried by the bracket 21. The motor continuously drives the sprocket 131, ratchet 132 in gear 130 and the shaft 80 is driven intermittently only when the pawl 122 is in engagement with the ratchet 132.

Figure 3:
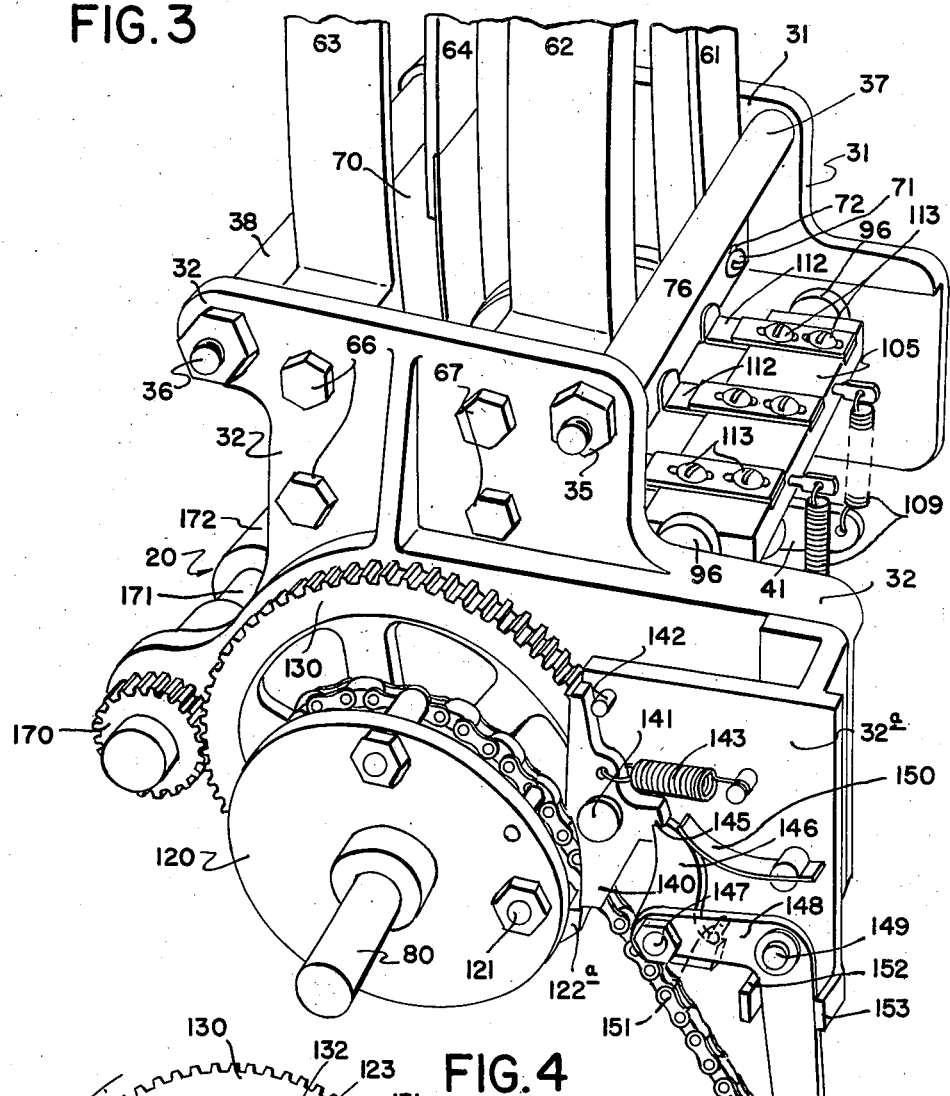
Fig. 3 is a perspective of the rear and drive end of the feeder.

The pawl 122 has an outwardly extending shoulder 122ª which is adapted to engage and to be held by a detent 140 (Fig. 3) which is pivotally mounted on a pin 141 on the casting 32ª secured to the end frame member 32 and which is normally held against a stop 142 by means of a spring 143. This detent has a shoulder 145 against which bears a trigger 146 which is pivotally mounted on a pin 147 on a crank 148, the latter being pivotally mounted at 149.

A leaf spring 150 serves the double purpose of urging the trigger 146 in a counter clockwise direction about the pin 147 and of urging the crank 148 in a counter clockwise direction about its pin 149. The trigger 146 has a stop 151 on the back of the crank 148 and two stops 152 and 153 serve to limit the movements both forward and back of the crank 148.

The bag-operative means for releasing the trigger 140 will now be described. It is shown in Fig. 1 and comprises a lever 155 secured to the lower end of a sleeve 156 which is rotatably mounted on the rod 157 which is secured to the end frame member 32. The upper end of the sleeve 156 carries a lever 158 on which is mounted an arcuate rod 159 passing through a hole in an arm 160 which is also pivotally mounted on the rod 157. A spring 161 is mounted on the outer end of the arcuate rod 159. A rod 162 is pivotally connected to the outer end of the arm 160 and is adjustably connected to the lower end of the crank 148.

Thus it will be seen that as a bag of flour A proceeds from right to left on the conveyor 25, it will engage the lever 155, causing the rod 162 to move the crank 148 in a clockwise direction thereby first lifting the shoulder 145 so as to rock the detent in a counter clockwise direction so as to release it from the shoulder 122ª. When this happens, the pawl 122 is forced into engagement with the ratchet 132 by means of the spring 123 and the disk 120 is then caused to make one complete revolution during which the picker fingers 90 operate, as has been previously described, to withdraw the lowermost coupon from the stack to carry it forward to a point where it will be stripped from the picker fingers by means of rolls which will now be described.

The gear 130 meshes with the pinion 170 keyed to the shaft 171 which is journalled in suitable bearings in the end frame members 31 and 32, as shown in Fig. 11. This shaft carries a roller 172 which is preferably rubber-faced and which normally contacts another rubber-faced roller 173. This latter is an idler and is mounted on a shaft 174 which is suitably journalled in bearings in the members 47 and 48. The normal inoperative position of the picker fingers 90 is that shown in Fig. 8 so that the coupon which has just been removed from the bottom of the stack is carried between the stripping rolls 172 and 173 which are constantly rotating and at a higher speed than that of the picker fingers. After passing the stripping rolls, the coupon is guided toward the bag by means of a chute 175 which is secured to the member 30 by a bracket 176.

As soon as the shaft 80 makes a single revolution, the shoulder 122ª of the pawl engages the detent 140, thereby disengaging the pawl from the ratchet 132 and bringing the shaft 80 and its associated parts to rest until the detent 140 is again released by the next bag.

Thus it will be seen that I have provided a very simple and efficient means of feeding a single coupon to each bag as it passes along the conveyor.

While I have shown and described but a single embodiment of my invention, it is to be understood that it is capable of many modifications. Changes, therefore, may be made which do not depart from the spirit and scope of my invention as disclosed in the appended claims.

I claim as my invention:

1. A feeder for folded coupons where each coupon has an overlapping edge and an overlapped edge, said feeder comprising an upwardly-extending chute, a fixed transversely arcuate surface at the bottom of the chute for supporting a stack of coupons in the chute, means at the rear of the chute for supporting the overlapping edge while the overlapped edge of the lowermost coupon is free to drop toward the arcuate surface, and picker fingers adapted to pass between the supported overlapping edge and the overlapped edge and to pass beyond the stack to draw the lowermost coupon from the stack.

2. A feeder for folded coupons where each coupon has an overlapping edge and an overlapped edge, said feeder comprising an upwardly-extending chute, a fixed transversely arcuate surface at the bottom of the chute adapted to support a stack of coupons in the chute, means at the rear of the chute for supporting the overlapping edge while the overlapped edge of the lowermost coupon is free to drop toward the arcuate surface, and picker fingers adapted to pass between the supported overlapping edge and the overlapped edge and to pass beyond the stack to draw the lowermost coupon from the stack, the arcuate surface having a raised middle portion shorter than the coupon so that the lowermost coupon overlaps the ends of the raised portion and is not supported at its outer ends.

3. A feeder for folded coupons where each coupon has an overlapping edge and an overlapped edge, said feeder comprising an upwardly-extending chute, a fixed transversely arcuate surface at the bottom of the chute adapted to support a stack of coupons in the chute, means at the rear of the chute for supporting the overlapping edge while the overlapped edge of the lowermost coupon is free to drop toward the arcuate surface, and picker fingers adapted to pass over the outer ends of the arcuate surface and concentrically therewith and between the supported overlapping edge and the overlapped edge and to pass beyond the stack to draw the lowermost coupon from the stack.

4. A feeder for folded coupons where each coupon has an overlapping edge and an overlapped edge, said feeder comprising an upwardly-extending chute, a fixed transversely arcuate surface at the bottom of the chute for supporting a stack of coupons in the chute, means at the rear of the chute for supporting the overlapping edge while the overlapped edge of the lowermost coupon is free to drop toward the arcuate surface, a shaft beneath the chute having an axis concentric with the arcuate surface, and picker fingers operably carried by said shaft adapted to pass between the supported overlapping edge and the overlapped edge and to pass beyond the stack to draw the lowermost coupon from the stack.

5. A feeder for folded coupons where each coupon has an overlapping edge and an overlapped edge, said feeder comprising an upwardly-extending chute, a fixed transversely arcuate surface at the bottom of the chute for supporting a stack of coupons in the chute, means at the rear of the chute for supporting the overlapping edge while the overlapped edge of the lowermost coupon is free to drop toward the arcuate surface, picker fingers adapted to pass between the supported overlapping edge and the overlapped edge and to pass beyond the stack to draw the lowermost coupon from the stack, and means for stripping the coupon from the picker.

6. A feeder for folded coupons where each coupon has an overlapping edge and an overlapped edge, said feeder comprising an upwardly-extending chute, a fixed transversely arcuate surface at the bottom of the chute for supporting a stack of coupons in the chute, means at the rear of the chute for supporting the overlapping edge while the overlapped edge of the lowermost coupon is free to drop toward the arcuate surface, picker fingers adapted to pass between the supported overlapping edge and the overlapped edge and to pass beyond the stack to draw the lowermost coupon from the stack, and means including rubber-covered rollers for stripping the coupon from the picker fingers.

7. A feeder for folded coupons where each coupon has an overlapping edge and an overlapped edge, said feeder comprising an upwardly-extending chute, a fixed transversely arcuate surface at the bottom of the chute for supporting a stack of coupons in the chute, means at the rear of the chute for supporting the overlapping edge while the overlapped edge of the lowermost coupon is free to drop toward the arcuate surface, picker fingers adapted to pass between the supported overlapping edge and the overlapped edge and to pass beyond the stack to draw the lowermost coupon from the stack, and spring means at the front normally retaining the lowermost coupon but yieldable to permit the picker fingers to pass thereunder to pass a coupon from the bottom of the stack.

8. A feeder for folded coupons where each coupon has an overlapping edge and an overlapped edge, said feeder comprising an upwardly-extending chute, a fixed transversely arcuate surface at the bottom of the chute for supporting a stack of coupons in the chute, means at the rear of the chute for supporting the overlapping edge while the overlapped edge of the lowermost coupon is free to drop toward the arcuate surface, a shaft beneath the chute having an axis concentric with the arcuate surface, and picker fingers operably carried by said shaft adapted to pass between the supported overlapping edge and the overlapped edge and to pass beyond the stack to draw the lowermost coupon from the stack, said shaft making a full rotation at each actuation.

9. A feeder for folded coupons where each coupon has an overlapping edge and an overlapped edge, said feeder comprising an upwardly-extending chute, a fixed transversely arcuate surface at the bottom of the chute for supporting a stack of coupons in the chute, means at the rear of the chute for supporting the overlapping edge while the overlapped edge of the lowermost coupon is free to drop toward the arcuate surface, picker fingers adapted to pass between the supported overlapping edge and the overlapped edge and to pass beyond the stack to draw the lowermost coupon from the stack, and means for positively lowering and gripping the rear edge of the overlapped portion to insure the entry of the picker fingers from each side between the upper and lower folds of the coupon.

10. A feeder for folded coupons where each has an overlapping edge and an overlapped edge, said feeder comprising an upwardly extending chute, fixed means at the bottom of said chute for supporting a stack of coupons in the chute, means in the rear of the chute for supporting the overlapping edge while the overlapped edge of the lowermost coupon is free to drop toward the first-mentioned means, picker fingers adapted to pass between the supported overlapping edge and the overlapped edge and to pass beyond the stack to draw the lowermost coupon from the stack, and means for positively lowering and gripping the rear edge of the overlapped portion of the coupon to said fixed means to insure the entry of the picker fingers from each side between the upper and lower folds of the coupon.

WARREN H. NOBLES.